(12) United States Patent
Staudacher

(10) Patent No.: US 6,657,621 B2
(45) Date of Patent: Dec. 2, 2003

(54) DEVICE AND METHOD FOR SCROLLING STORED IMAGES ACROSS A DISPLAY

(75) Inventor: David J Staudacher, Ft Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 225 days.

(21) Appl. No.: 09/846,406

(22) Filed: May 1, 2001

(65) Prior Publication Data

US 2002/0163512 A1 Nov. 7, 2002

(51) Int. Cl.[7] .................................................. G09G 5/36
(52) U.S. Cl. ....................................... 345/204; 345/560
(58) Field of Search ................................. 345/204, 507, 345/435, 560; 348/79, 80, 61, 239, 232; 463/43

(56) References Cited

U.S. PATENT DOCUMENTS

| | | | | |
|---|---|---|---|---|
| 4,908,610 A | * | 3/1990 | Yamamuro et al. | 345/600 |
| 5,754,186 A | * | 5/1998 | Tam et al. | 345/629 |
| 5,933,154 A | * | 8/1999 | Howard et al. | 345/540 |
| 6,005,572 A | * | 12/1999 | Kurihara | 345/531 |
| 6,208,374 B1 | * | 3/2001 | Clinch | 348/79 |
| 6,366,316 B1 | * | 4/2002 | Parulski et al. | 348/239 |
| 6,468,161 B1 | * | 10/2002 | Shimomura | 463/43 |

* cited by examiner

Primary Examiner—Vijay Shankar
Assistant Examiner—Nitin Patel

(57) ABSTRACT

A device configured to display images. The device comprises a storage component, a first buffer, a second buffer and a display controller. The first buffer comprises a plurality of memory locations and is configured to store a first image from the storage component. The second buffer comprises a plurality of memory locations and is configured to store a second image from the storage component. The memory locations of the first buffer are interleaved with the memory locations of the second buffer in a common memory space. The display controller is coupled to the first and second buffers and is configured to retrieve a part of the first image from the first buffer and a part of the second image from the second buffer.

23 Claims, 3 Drawing Sheets

DEVICE AND METHOD FOR SCROLLING STORED IMAGES ACROSS A DISPLAY

BACKGROUND OF THE INVENTION

1. Field of the Invention

The present invention relates to electronic devices, and more particularly to devices with displays configured to display stored images.

2. Description of the Related Art

Some digital cameras have a memory to store a plurality of images and a display to view an image stored in the memory.

SUMMARY OF THE INVENTION

Some digital cameras have a memory to store a plurality of executable functions, modules and data. But any memory space available for buffering images for quick retrieval and display is limited.

A device and method for scrolling stored images across a display are provided in accordance with the present invention. The device may be any electronic device with a display, such as a digital camera. One aspect of the device provides smooth and continuous horizontal scrolling from one image to another image. In one embodiment, a processor stores a plurality of decoded images in a plurality of frame buffers. The decoded images are available for a display controller to quickly retrieve and display before and after a currently displayed image.

Another aspect of the device provides a scroll rate that is faster than the scroll rates provided by other display devices. In addition, a profile of variable scroll rates may be stored in tables. Variable scroll rates may simulate acceleration and deceleration and achieve a visually pleasing result.

Another aspect of the device efficiently uses processing cycles of a processor. The device allows processing cycles to be slowed to conserve power.

One aspect of the invention relates to a device configured to display images. The device comprises a storage component, a first buffer, a second buffer and a display controller. The storage component is configured to store a plurality of images. The first buffer comprises a plurality of lines and is configured to store a first image from the storage component. The second buffer comprises a plurality of lines and is configured to store a second image from the storage component. The lines of the first buffer are interleaved with the lines of the second buffer in a common memory space. The display controller is coupled to the first and second buffers. The display controller is configured to retrieve a part of the first image from the first buffer and a part of the second image from the second buffer. The display controller is further configured to send the retrieved parts to a display.

Another aspect of the invention relates to a method of displaying images. The method comprises copying a first image from a storage component into a first buffer and copying a second image from the storage component into a second buffer. The first and second buffers comprise a plurality of lines interleaved in a common memory space. The method further comprises retrieving a part of the first image from the first buffer and a part of the second image from the second buffer and sending the retrieved parts to a display.

DETAILED DESCRIPTION

Figure 1:
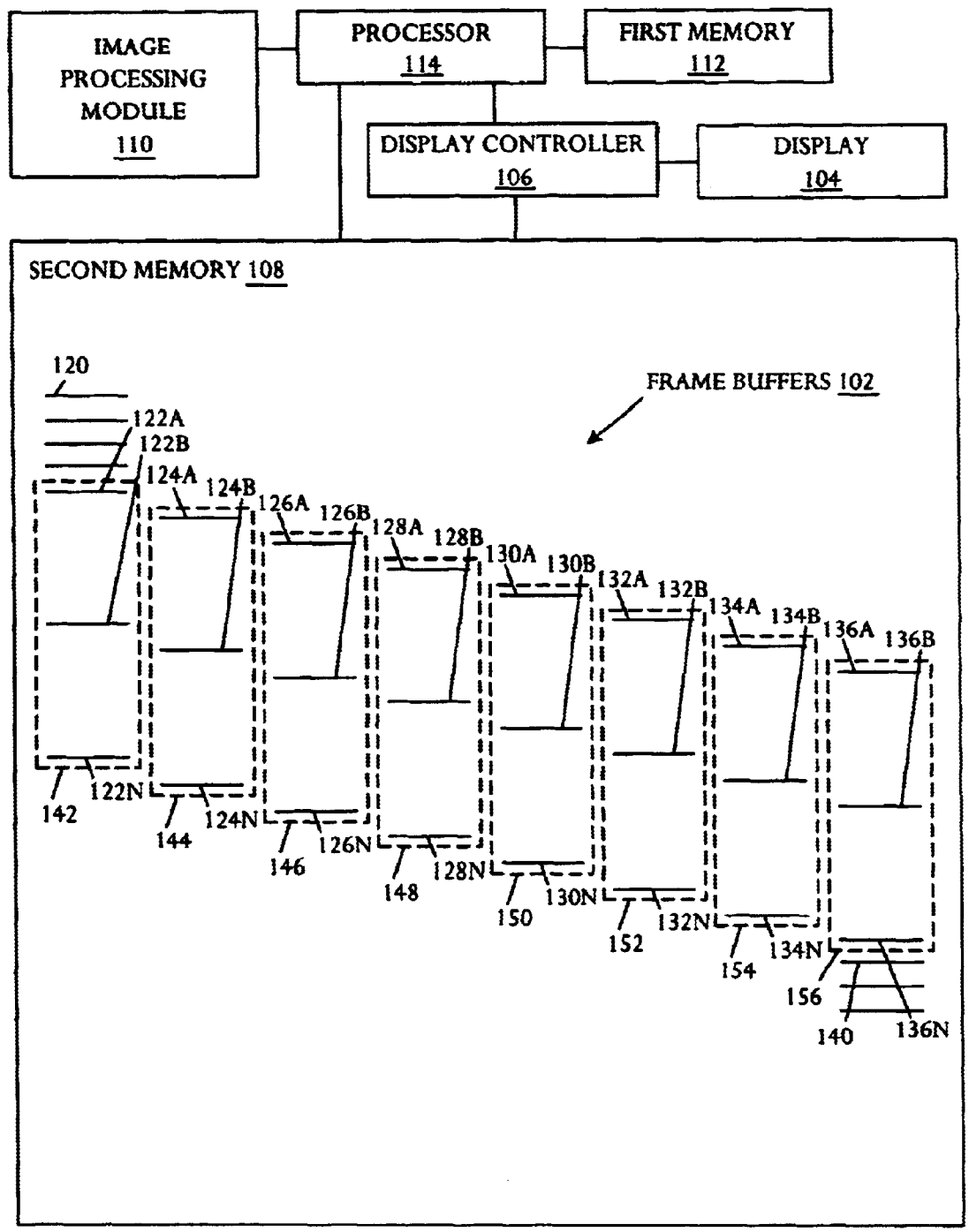
FIG. 1 illustrates one embodiment of an electronic device.

FIG. 1 illustrates one embodiment of an electronic device 100. In one embodiment, the device 100 comprises a digital camera, such as a PhotoSmart 618 Digital Camera made by Hewlett-Packard. The device 100 in FIG. 1 comprises a set of frame buffers 102, a display 104, a display controller 106, a second memory 108, an image processing module 110, a first memory 112 and a processor 114. Those of ordinary skill in the art will appreciate that the device 100 in FIG. 1 may comprise other components in addition to or instead of the components described herein, such as a power supply, a lens, input and output data ports.

The image processing module 110 in FIG. 1 may comprise hardware, software or both configured to capture and process images. The processor 114 comprises any suitable processor configured to execute firmware to control captured images in the first and second memories 112, 108.

The first memory 112 in FIG. 1 comprises a non-volatile storage media or memory unit, such as a flash erasable programmable read only memory (EPROM) or a hard drive coupled to the processor 114. In one embodiment, the memory 112 is built into the device 100. In another embodiment, the first memory 112 is removable, such as Secure Digital, which is a type of removable flash memory, or a Permanent Inexpensive Removable Memory (PIRM) developed by Hewlett Packard. In one embodiment, the memory 112 comprises a CompactFlash™ card made by Hewlett-Packard.

The first memory 112 may store firmware, variables used by the firmware and/or any number of images captured by the image processing module 110 or some external device. The first memory 112 or the second memory 108 may store firmware executable by the processor 114 to perform the functions described herein. Alternatively, the firmware may be stored in the processor 114 itself or in a third memory (not shown).

The second memory 108 in FIG. 1 comprises a storage media or memory unit, such as a random access memory (RAM) or a synchronous dynamic random access memory (SDRAM). In one embodiment, the memory 108 comprises a volatile memory. A portion of the memory 108 is dedicated to store a plurality of images transferred by the processor 114 from the memory 112. This portion of the memory 108 may be referred to as "display buffers" or "frame buffers" 102. The images in the frame buffers 102 can be quickly retrieved by the display controller 106 to display on the display 104. Although the memory 108 shown in FIG. 1 comprises eight frame buffers 142–156 to store eight images for quick retrieval, other portions of the memory 108 may store any number of images, such as 4 images, 8 images, 30 images or 100 images. Also, the memory 108 may have any number of frame buffers 102. For example, the memory 108 shown in FIG. 1 has 8 frame buffers 142–156. In another embodiment, the memory 108 has 16 frame buffers.

In another embodiment, the frame buffers 102 are implemented in a storage component, such as RAM, that is separate from the memory 108. In one embodiment, the device 100 may have a one storage component (e.g., the memory 112) that comprises, for example, 32 or 64 Mbytes, to store a plurality of encoded images and another storage component (e.g., the frame buffers 102) that comprises, for example, 5 Mbytes, to store decoded images for quick retrieval.

In one embodiment, each frame buffer 142, 144, 146, 148, 150, 152, 154, 156 in FIG. 1 stores one image. In one embodiment, each frame buffer 142, 144, 146, 148, 150, 152, 154, 156 comprises 248,832 bytes. In another embodiment, each frame buffer 142, 144, 146, 148, 150, 152, 154, 156 comprises 124,416 bytes. In still other embodiments, the frame buffers 142–156 may have other sizes.

The display 104 in FIG. 1 may comprise any suitable display for displaying one or more images to a user. In one embodiment, the display 104 comprises a color or black and white liquid crystal display (LCD).

In one embodiment, the display controller 106 in FIG. 1 comprises an application specific circuit (ASIC) with registers to store variables. The variables may be configured and changed by the processor 114. The display controller 106 retrieves image data from the frame buffers 102 and sends the image data to the display 104 for display. In one embodiment, the display controller 106 is integrated with the microprocessor 114.

Figure 2A:
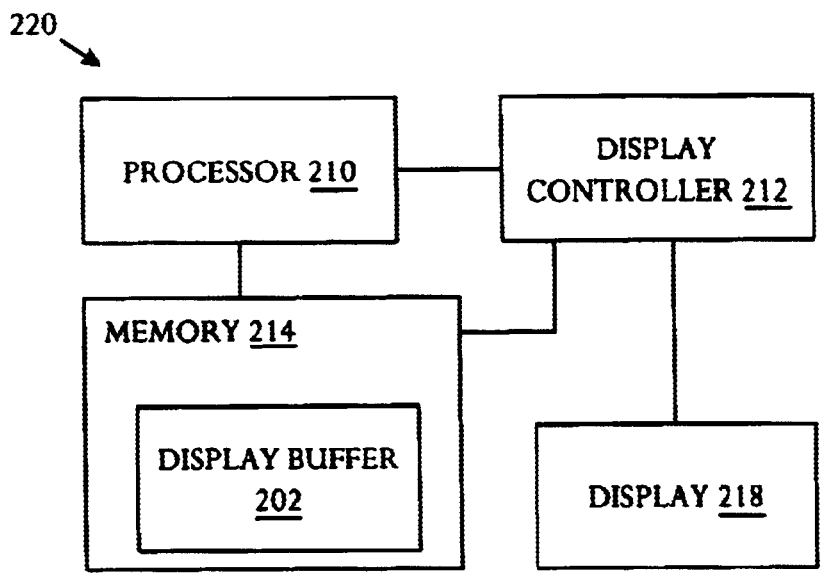
FIG. 2A illustrates a device, such as a digital camera, comprising a processor, a display controller, a memory, a display buffer and a display.
Figures 2B, 2C, 2D:
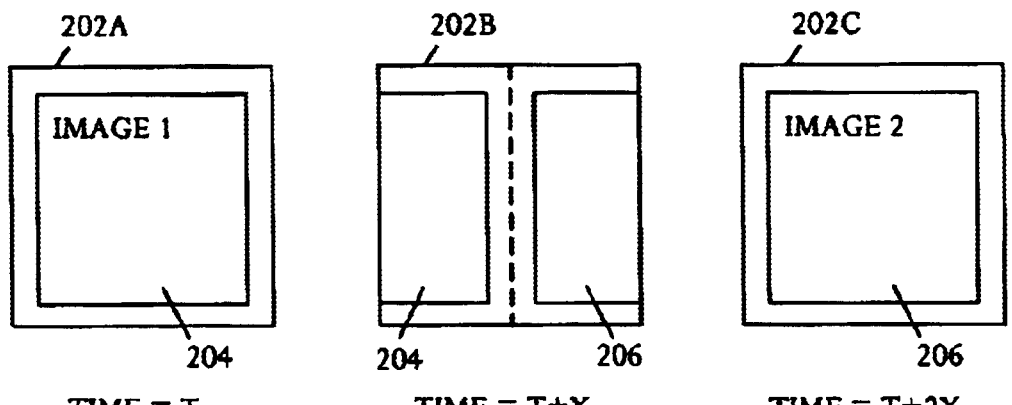
FIGS. 2B–2D illustrate the display buffer in FIG. 2A at various times as a user commands the device in FIG. 2A to display two captured images on the display.

FIG. 2A illustrates a device 220, such as a digital camera, comprising a processor 210, a display controller 212, a memory 214, a display buffer 202 and a display 218. FIG. 2B illustrates the display buffer 202 in FIG. 2A when a user commands the device 220 to display a first captured image 204 on the display 218. Alternatively, the device 220 may automatically display a first captured image 204 on the display 218. The processor 210 copies (or "draws") the first image 204 from the memory 214 to the display buffer 202A (FIG. 2B). The display controller 212 (FIG. 2A) transfers the first image 204 from the display buffer 202A to the display 218. At a time T in FIG. 2B, the user uses a control key (not shown) on the device 220 to advance from the first image 204 to a second image 206 on the display 218.

FIG. 2C illustrates the display buffer 202 in FIG. 2A at a time T+X after the user uses the control key on the device 220 at time T (FIG. 2B) to view a part of the first image 204 and a part of a second image 206 on the display 218. In one embodiment, the user presses a control key on the device 220 once, and the device 220 displays subsequent images, such as the second image 206. In another embodiment, the user continues to press a key on the device 220, and the device 220 displays subsequent images, such as the second image 206. In FIG. 2C, the processor 210 copies a "slice" of the first image 204 and a slice of a second image 206 from the memory 214 to the display buffer 202B at time=T+X. The display controller 212 transfers the slices of the first and second images 204, 206 from the display buffer 202B to the display 218.

FIG. 2D illustrates the display buffer 202 in FIG. 2A at a time T+2X, after the user pressed a control key on the device 220 either once or continuously to view subsequent images, as described above. The processor 210 copies the second image 206 from the memory 214 to the display buffer 202C (FIG. 2D) at time=T+2X. The display controller 212 transfers the second image 206 from the display buffer 202C to the display 218.

The structure and process described with reference to FIGS. 2A–2D may involve intense processing by the processor 210 and discontinuous horizontal scrolling of multiple images, i.e., "jerky" scrolling of only a few "slices" of multiple images, not smooth scrolling from image to image. Moreover, the scroll rate may be slow and undesirable to a user of the device 220.

Figure 3:
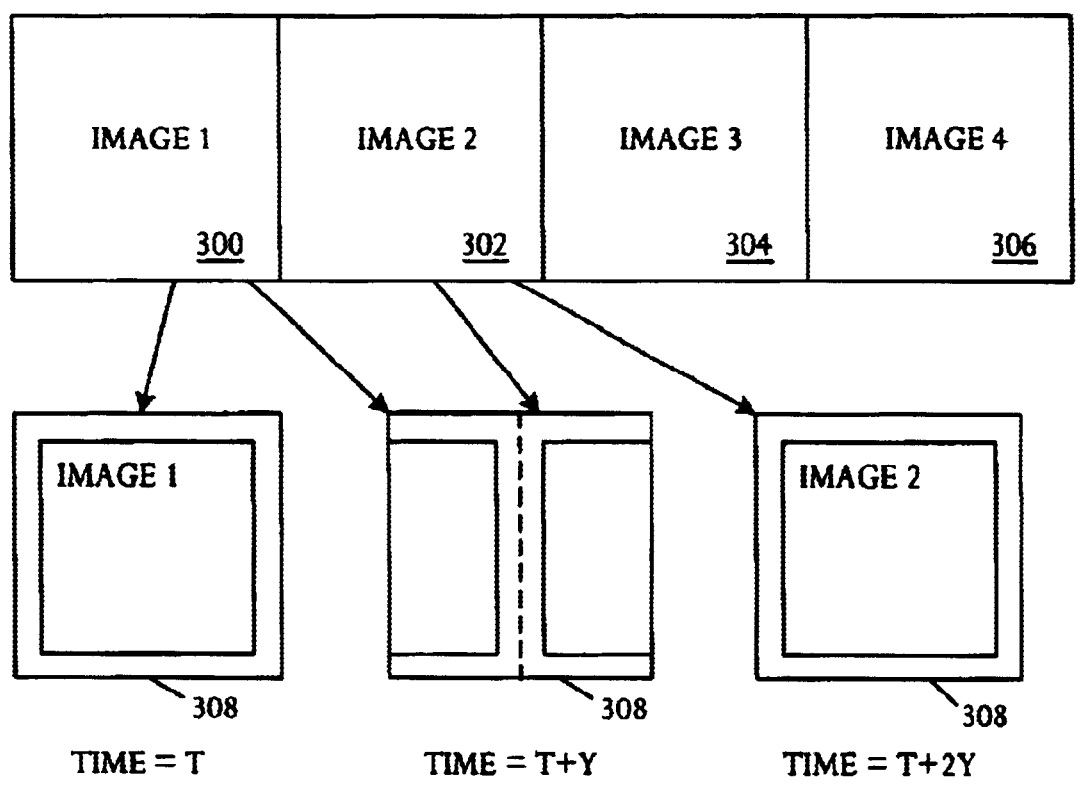
FIG. 3 illustrates one embodiment of a plurality of image buffers and a display buffer in the memory of FIG. 2A.

FIG. 3 illustrates one embodiment of a plurality of image buffers 300–306 and a display buffer 308 in the memory 214 of FIG. 2A. The first, second, third and fourth image buffers 300–306 are configured to store first, second, third and fourth images, respectively. Although only four frame buffers 300–306 are shown in FIG. 3, the device 100 in FIG. 1 may comprise any number of frame buffers to store any number of images.

At a time T, the processor 210 in FIG. 2 copies (or draws) the first image from the first image buffer 300 to the display buffer 308. The copying may also be described as "direct memory accessing" (DMA). The display controller 212 may then transfer the first image from the display buffer 308 to the display 218.

At a time T+Y, the processor 210 copies a part of the first image from the first image buffer 300 and a part of the second image from the second image buffer 302 to the display buffer 308. The display controller 212 may then transfer the parts of the first and second images from the display buffer 308 to the display 218.

At a time T+2Y, the processor 210 copies the second image from the second image buffer 302 to the display buffer 308. The display controller 212 may then transfer the second image from the display buffer 308 to the display 218.

The structure and process described with reference to FIG. 3 may have the same disadvantages as the structure and process described with reference to FIGS. 2A–2D.

In contrast, the structures and processes described herein with reference to FIG. 1 provide a smooth, continuous horizontal scrolling of multiple images from one image to another image. Moreover, the scroll rate is faster than the scroll rate provided by the structures and processes described with reference to FIGS. 2A–2D and FIG. 3.

Interleaving of Frame Buffers

The processor 114 executes firmware to interleave the memory locations of the frame buffers 142–156 in FIG. 1 on a line-by-line basis in the memory 108. In FIG. 1, a first set of lines 122A–136A represents the first lines of the eight buffers 142–156. In one embodiment, each line in FIG. 1, such as the first line 122A, comprises 1,152 bytes. In other embodiments, each line comprises less than or more than 1,152 bytes, such as 576 bytes. The last byte of the first line 122A of the first buffer 142 is followed by the first byte of the first line 124A of the second buffer 144 in the memory 108.

In one embodiment, each line in FIG. 1, such as the first line 122A, is configured to store one row of pixels of an image. In one embodiment, there are 216 lines per buffer to store 216 rows of pixels per image. In other embodiments, each line in FIG. 1, such as the first line 122A, is configured to store more than one row of pixels of an image.

In one embodiment, a pixel is represented by two or four bytes, which may comprise a blue color component, a first luminescence (or brightness) component, a red color component and a second luminescence (or brightness) component. Another example of a pixel represented by two or four bytes comprises a red color component, a green color component, a blue color component and a brightness component. As another example, a pixel may be represented by three bytes, such as a red color component, a green color component and a blue color component.

For example, a first line 122A of the first buffer 142 is configured to store a first row of pixels of a first image. A first line 124A of the second buffer 144 is configured to store a first row of pixels of a second image. This pattern repeats such that a first line 136A of the eighth buffer 156 is configured to store a first row of pixels of an eighth image.

A second set of lines 122B–136B represents the second lines of the eight buffers 142–156. For example, a second line 122B of the first buffer 142 is configured to store a second row of pixels of the first image. A second line 124B of the second buffer 144 is configured to store a second row of pixels of the second image. This pattern repeats such that a second line 136B of the eighth buffer 156 is configured to store a second row of pixels of the eighth image.

An N set of lines 122N–136N (e.g., $216^{th}$ set of lines) represents the Nth lines of the eight buffers 142–156. For example, an Nth line 122N of the first buffer 142 is configured to store an Nth row of pixels of the first image. This pattern repeats such that an Nth line 136N of the eighth buffer 156 is configured to store an Nth row of pixels of the eighth image.

Arranging the frame buffers 102 as shown in FIG. 1 allows the display controller 106 to scroll smoothly from image to image by stepping the display controller's start address pointer across the lines of the buffers, as described below.

Extra Lines

In one embodiment, a plurality of extra available lines 120, 140 are configured or allocated in the memory 108 before the first line 122A of the first frame buffer and after the last line 136B of the last frame buffer, respectively. The extra lines 120, 140 are configured to support wraparound such that a user may view additional images after the user scrolls horizontally past the last image buffer 156 on the display 104, as described below.

Retrieving Images by the Display Controller

In a "playback" or "display" mode, the processor 114 executes firmware and instructs the display controller 106 in FIG. 1 where to retrieve image data from the frame buffers 102. The firmware may configure a plurality of variables to be used by the display controller 106. For example, the variables may comprise a pointer, a number of bytes per line, a number of frame buffers in the memory 108 and a line-to-line spacing variable. In one embodiment, the display controller 106 stores one or more of these variables in registers. In one embodiment, the display controller 106 only stores the pointer, a number of bytes per line and a line-to-line spacing variable in registers.

The pointer may be referred to as "TLC," "TLC pointer," "TLC PTR" or "start address pointer." The firmware initially sets the start address pointer to a memory address that corresponds to the top left hand corner of an image stored in a buffer, such as the first frame buffer 142. For example, to retrieve the first row of pixels of the first image stored in the first frame buffer 142, the start address pointer of the display controller 106 points to the memory address of the first byte of the first line 122A of the first buffer 142.

The display controller 106 uses the line-to-line spacing variable to retrieve the remaining lines of a buffer, such as the first frame buffer 142. The display controller's line-to-line spacing variable is equal to the total number of frame buffers 102 multiplied by the total bytes per line.

line-to-line spacing=(number of buffers)×(number of bytes per line)

In one embodiment, the memory 108 comprises eight buffers, each line has 1,152 bytes, and the line-to-line spacing is 9,216. In another embodiment, the memory 108 comprises 16 buffers, each line has 1,152 bytes, and the line-to-line spacing is 18,432. In other embodiments, the line-to-line spacing may vary depending on the number of buffers 102 and the number of bytes per line.

In the embodiment with a line-to-line spacing of 9,216, the display controller 106 starts at the memory address of the first byte (e.g., address "0") of the first line 122A and retrieves the first line 122A of 1,152 bytes of the first buffer 142. The display controller 106 then skips 9,216 bytes from the memory address of the first byte (e.g., address "0") of the first line 122A to the memory address of the first byte of the second line 122B (e.g., address "9,216"), and retrieves the second line 122B of 1,152 bytes of the first buffer 142. The display controller 106 continues this process until the last line 122N of the first buffer 142 is retrieved.

When some or all of the lines are retrieved for the first image stored in the first buffer 142, the display controller 106 may display the first image on the display 104. In one embodiment, if the image data retrieved from the first frame buffer 142 is encoded, the display controller 106 decodes the image data before displaying the first image. The display controller 106 is configured to retrieve lines from the memory 108 and display an image at high speeds.

When the user presses a right arrow key on the device 100 or a right scroll item on the display 104, the firmware executed by the processor 114 and the display controller 106 scrolls a display "window" from the first image in the first buffer 142 to a part of the second image in the second buffer 144. In one embodiment, the user presses a control key on the device 100 once, and the device 100 scrolls horizontally to display subsequent images. In another embodiment, the user continues to depress a key on the device 100, and the device 100 scrolls horizontally to display subsequent images. In FIG. 1, the firmware of the processor 114 increments the start address pointer by a value "S," and the display controller 106 steps (or slides) from the first byte of the first line 122A in steps of "S" bytes towards the second line 124A.

Similarly, when the user presses a left arrow key on the device 100 or a left scroll item on the display 104, the firmware decrements the start address pointer by the value "S," and the display controller 106 steps (or slides) from the first byte of the first line 122A in steps of "S" bytes towards the eighth line 136A.

In one embodiment, "S" is a constant, and the steps of "S" bytes are evenly spaced in time to yield a constant scroll rate. "S" may be configured to be any number, depending on a desired level of smoothness as a user scrolls from image to image. In one embodiment, "S" is equal to four bytes. In another embodiment, "S" is equal to eight bytes. With a small "S," such as four or eight bytes, the scrolling of images across the display 104 appears smooth to a user. With a large "S," a user may notice distinct shifts of the scrolling of images.

In the embodiment where "S" is equal to four bytes, the firmware increments the start address pointer by four, and the display controller 106 starts at the memory address of the first byte of the first line 122A (e.g., address "0") of the first buffer plus an offset of four bytes. Thus, the display controller 106 starts at a fifth byte of the first line 122A (e.g., address of "4") and retrieves 1,152 bytes, which includes 1,148 bytes of the first line 122A of the first buffer 142 and the first four bytes of the first line 124A of the second buffer 144.

The display controller 106 then skips 9,216 bytes from the fifth byte of the first line 122A (e.g., address of "4") to the fifth byte of the second line 122B (address "9,220") of the first buffer 142. The display controller 106 retrieves 1,152 bytes, which includes 1,148 bytes of the second line 122B of the first buffer 142 and the first four bytes of the second line 124B of the second buffer 144. The display controller 106 continues this process until the first four bytes of the last line 124N of the second buffer 144 is retrieved.

When some or all of the bytes are retrieved, the display controller 106 may display a part of the first image and a part of the second image on the display 104. The display controller 106 is configured to retrieve lines from a plurality of buffers 102 in the memory 108 and display a plurality of images on the display 104 at high speeds.

Acceleration and Deceleration

In one embodiment, the firmware may increase or decrease "S" as a function of time to create the appearance of accelerating or decelerating the rate of image scrolling on the display 104. For example, if a user scrolls to the right for a period of time (e.g., the user presses and/or holds down the right arrow key or right scroll item for a period of time, such as two seconds), the firmware may increase "S" from four to eight to 16 bytes or higher. Increasing "S" creates the appearance of accelerating the rate of image scrolling on the display 104. Similarly, the firmware may decrease "S" from 16 to eight to four bytes or less. Decreasing "S" creates the appearance of decelerating the rate of image scrolling on the display 104.

The memory 108 or the processor 114 may store a table of values to be incremented and decremented to "S" to create the appearance of acceleration or deceleration.

Invalidating Images and Utilizing the Extra Lines 120, 140

To support a fast scroll rate, the processor 114 may store new images in one or more frame buffers that (1) have been passed by the user's scrolling or (2) are the farthest from an image that is currently being viewed by the user on the display 104. For example, a user may scroll a "window" on the display 104 to the right from a first image to a second image to a third image to a fourth image. When the display controller 106 displays the fourth image (or the beginning of the fifth image) on the display 104, the processor 114 may load a new image (a ninth image) from the memory 112 into the first buffer 142, starting at the second line 122B of the first buffer 142, continuing through to the Nth line 122N and using one or more of the extra lines 140.

Thus, the device 100 provides "wraparound" and allows the user to see a ninth image copied from the memory 112 to the first buffer 142 and then to the display 104 after the user views the eighth image on the display 104. The extra lines 120, 140 may improve the efficiency of the device 100 when the number of images stored in the memory 112 is greater than the number of frame buffers 102.

Alternatively, the user may select an image stored in the fourth buffer 148 to be displayed on the display 104 (e.g., jump to the image stored in the fourth buffer 148), and the processor 114 may load a new image in the first buffer 142, starting at the second line 122B of the first buffer 142, continuing through to the Nth line 122N and using one or more of the extra lines 140.

Similarly, when the display controller 106 displays the fifth image (or the beginning of the sixth image), the processor 114 may write over the second image in the second buffer 144 and load a new image, starting at the second line 124B of the second buffer 144, continuing through to the Nth line 124N and using one or more of the extra lines 140.

In one embodiment, the processor 114 "invalidates" a buffer, such as the first buffer 142 (e.g., by setting a flag) when the processor 114 is loading a new image in the buffer. An "invalidated" buffer prevents the display controller 106 from reading the buffer until a new image is completely loaded in the buffer.

As another example, if the user scrolls backwards, e.g., from the fifth image to the fourth image, the processor 114 may write over and invalidate the eighth image and load a new image in the eighth buffer 156 and use one or more of the extra lines 140 or 120.

In one embodiment, the images stored in the memory 112 are encoded with a format, such as Joint Photographic Experts Group (JPEG), and the processor 114 decodes the images from the memory 112 before storing the images in a frame buffer, such as the first frame buffer 142. A goal of the processor 114 may be to keep a plurality of decoded images in the frame buffers 102 before and after a "current" image being viewed by the user on the display 104. The images in the frame buffers 102 may be retrieved quickly for the display controller 106 to send to the display 104.

Examples of code executable by the processor 114 are listed below. The bracketed items, such as <ENTER DISPLAY MODE>, are user actions or background operations.

<ENTER DISPLAY MODE> decode image "n" starting at line 128A set display TLC to line 128A (decode other images from the memory 112 opportunistically)

<PRESS RIGHT ARROW> slide display TLC from line 128A to line 130A [assuming that an image is already loaded at line 130A] (i.e., start sliding)

invalidate image at line 122A (decode another image from the memory 112 and store at "n+5," starting at line 122B)

<PRESS RIGHT ARROW AGAIN> start sliding display TLC from line 130A to line 132A [assuming that an image is already loaded at line 132A]

invalidate image at line 124A (decode image "n+6" starting at 124B)

<PRESS LEFT ARROW> start sliding display TLC from line 132A to line 130A invalidate image at line 124B (decode image "n−2" at 124A)

When the user reaches the end of the "slots," e.g., when a last line of the last image starts at last line of the extra lines 140):

the display controller 106 blanks the display 104 the processor 114 transfers valid frames from the memory 112 to the center "slots"

the firmware sets the TLC to a new location of a current image the display controller 106 unblanks the display 104 and the process continues The above-described embodiments of the present invention are merely meant to be illustrative and not limiting. Various changes and modifications may be made without departing from the invention in its broader aspects. The appended claims encompass such changes and modifications within the spirit and scope of the invention.

What is claimed is:

1. A device configured to display images, the device comprising:

a storage component configured to store a plurality of images;

a first buffer comprising a plurality of memory locations, the memory locations configured to store a first image from the storage component;

a second buffer comprising a plurality of memory locations, the memory locations configured to store a second image from the storage component, wherein the memory locations of the first buffer are interleaved with the memory locations of the second buffer in a common memory space; and a display controller coupled to the first and second buffers, the display controller configured to retrieve a part of the first image from the first buffer and a part of the second image from the second buffer, the display controller further configured to send the retrieved image parts to a display.

2. The device of claim 1, wherein the device comprises a digital camera.

3. The device of claim 1, wherein the storage component comprises a media that is removable from the device.

4. The device of claim 1, wherein the storage component comprises a CompactFlash card made by Hewlett Packard.

5. The device of claim 1, wherein the first and second buffers comprise allocated memory locations within the storage component.

6. The device of claim 1, wherein the first and second buffers are separate from but coupled to the storage component.

7. The device of claim 1, wherein the first and second buffers are implemented in a random access memory.

8. The device of claim 1, wherein each memory location is configured to store data associated with a row of pixels of an image.

9. The device of claim 1, further comprising extra memory locations after the second buffer, the extra memory locations configured to store image data associated with a third image.

10. The device of claim 1, further comprising extra memory locations before the first buffer, the extra memory locations configured to store image data associated with a third image.

11. The device of claim 1, further comprising a processor coupled to the first buffer, the processor configured to overwrite image data in the first buffer while image data in the second buffer is being displayed on a display.

12. The device of claim 1, further comprising an image processing module coupled to the storage component, the image processing module configured to capture and store images in the storage component.

13. A device configured to display images, the device comprising:

a storage component configured to store a plurality of images;

a first buffer comprising a plurality of memory locations, the memory locations configured to store a first image from the storage component;

a second buffer comprising a plurality of memory locations, the memory locations configured to store a second image from the storage component, wherein the memory locations of the first buffer are interleaved with the memory locations of the second buffer in a common memory space; and a display controller coupled to the first and second buffers, the display controller configured to retrieve a part of the first image from the first buffer and a part of the second image from the second buffer, the display controller further configured to send the retrieved image parts to a display, wherein the display controller uses a start address pointer and a line-to-line spacing variable to retrieve image data from the first and second buffers, the line-to-line spacing variable being equal to a number of bytes per memory location multiplied by a number of buffers.

14. The device of claim 13, wherein the display controller retrieves a predetermined number of bytes starting at a first memory location specified by the start address pointer, skips to a second memory location specified by the line-to-line spacing variable, retrieves the pre-determined number of bytes starting at the second memory location, and repeats these acts of skipping and retrieving until a predetermined number of bytes have been retrieved.

15. The device of claim 13, further comprising a processor coupled to the display controller, the processor configured to increment the start address pointer at a constant rate in response to a user scroll command.

16. The device of claim 13, further comprising a processor coupled to the display controller, the processor configured to increment the start address pointer at a variable rate in response to a user scroll command.

17. The device of claim 13, further comprising a processor coupled to the display controller, the processor configured to decrement the start address pointer in response to a user scroll command.

18. A method of displaying images, the method comprising:

copying a first image from a storage component into a first buffer and copying a second image from the storage component into a second buffer, the first and second buffers comprising a plurality of memory locations interleaved in a common memory space;

retrieving a part of the first image from the first buffer and a part of the second image from the second buffer; and sending the retrieved parts to a display.

19. A method of displaying images, the method comprising:

copying a first image from a storage component into a first buffer and copying a second image from the storage component into a second buffer, the first and second buffers comprising a plurality of memory locations interleaved in a common memory space;

retrieving a part of the first image from the first buffer and a part of the second image from the second buffer; and sending the retrieved parts to a display, wherein retrieving a part of the first image from the first buffer and a part of the second image from the second buffer comprises:

retrieving a predetermined number of bytes starting at a first memory location specified by a start address pointer;

skipping to a second memory location specified by a line-to-line spacing variable and retrieving the pre-determined number of bytes starting at the second memory location, the line-to-line spacing variable being equal to a number of bytes per memory location multiplied by a number of buffers; and repeating these acts of skipping and retrieving until a predetermined number of bytes have been retrieved.

20. The method of claim 19, further comprising incrementing the start address pointer at a constant rate in response to a user scroll command.

21. An article of manufacture comprising:

a processor usable medium having a computable readable program code embodied therein for displaying images in a system including a storage component and a plurality of buffers, the computable readable program code further comprising:

a computable readable program code capable of causing the processor to copy a first image from a storage component into a first buffer and copy a second image from the storage component into a second buffer, the first and second buffers comprising a plurality of memory locations interleaved in a common memory space;

a computable readable program code capable of causing the processor to retrieve a part of the first image from the first buffer and a part of the second image from the second buffer; and a computable readable program code capable of causing the processor to send the retrieved parts to a display.

22. The article of manufacture according to claim 21, wherein the computable readable program code capable of causing the processor to retrieve a part of the first image from the first buffer and a part of the second image from the second buffer comprises:

a computable readable program code capable of causing the processor to retrieve a predetermined number of bytes starting at a first memory location specified by a start address pointer;

a computable readable program code capable of causing the processor to skip to a second memory location specified by a line-to-line spacing variable and retrieve the pre-determined number of bytes starting at the second memory location, the line-to-line spacing variable being equal to a number of bytes per memory location multiplied by a number of buffers; and a computable readable program code capable of causing the processor to repeat the skipping and retrieving until a predetermined number of bytes have been retrieved.

23. The article of manufacture according to claim 22, further comprising:

a computable readable program code capable of causing the processor to increment the start address pointer at a constant rate in response to a user scroll command.

* * * * *